US009682617B2

United States Patent
Hill et al.

(10) Patent No.: US 9,682,617 B2
(45) Date of Patent: Jun. 20, 2017

(54) SOLID STATE VENTING VALVE FOR A FUEL TANK

(71) Applicant: Inergy Automotive Systems Research (Societe Anonyme), Brussels (BE)

(72) Inventors: David Hill, Commerce Township, MI (US); Joseph Douglas Chiasson, US-Royal Oak, MI (US)

(73) Assignee: Inergy Automotive Systems Research (Société Anonyme), Brussels (DE)

( * ) Notice: Subject to any disclaimer, the term of this patent is extended or adjusted under 35 U.S.C. 154(b) by 0 days.

(21) Appl. No.: 14/390,636

(22) PCT Filed: Apr. 3, 2013

(86) PCT No.: PCT/EP2013/056982
§ 371 (c)(1),
(2) Date: Oct. 3, 2014

(87) PCT Pub. No.: WO2013/150050
PCT Pub. Date: Oct. 10, 2013

(65) Prior Publication Data
US 2015/0053704 A1 Feb. 26, 2015

Related U.S. Application Data

(60) Provisional application No. 61/619,494, filed on Apr. 3, 2012.

(30) Foreign Application Priority Data

Oct. 11, 2012 (EP) .................................... 12188194

(51) Int. Cl.
B60K 15/035 (2006.01)
B01D 19/00 (2006.01)
B60K 15/03 (2006.01)

(52) U.S. Cl.
CPC .... B60K 15/03519 (2013.01); B01D 19/0031 (2013.01); *B60K 2015/03276* (2013.01)

(58) Field of Classification Search
CPC .. B01D 19/00; B01D 19/0031; B60K 15/035; B60K 15/03519; B60K 2015/03276
(Continued)

(56) References Cited

U.S. PATENT DOCUMENTS 5,183,087 A * 2/1993 Aubel .............. B60K 15/03504
123/518
5,343,905 A * 9/1994 Gryc ................ B60K 15/03504
137/587

(Continued)

FOREIGN PATENT DOCUMENTS

DE 43 12 374 10/1994
FR 2 774 951 8/1999
(Continued)

OTHER PUBLICATIONS

European Search Report Issued Mar. 21, 2013 in Application No. 12 18 8194 Filed Oct. 11, 2012.
(Continued)

*Primary Examiner* — Timothy L Maust
*Assistant Examiner* — Andrew Schmid
(74) *Attorney, Agent, or Firm* — Oblon, McClelland, Maier & Neustadt, L.L.P.

(57) ABSTRACT

A valve apparatus for use in an interior of a fuel tank, a fuel tank including the valve apparatus, and a motor vehicle including the fuel tank. The valve apparatus includes a substantially flat housing defining a channel between an inlet orifice and an outlet orifice, and a membrane arranged to seal the channel. The membrane is configured to be impermeable to liquid fuel and permeable to fuel vapor.

15 Claims, 7 Drawing Sheets

(58) Field of Classification Search
USPC .................................. 141/198; 220/746; 96/6
See application file for complete search history.

(56) References Cited

U.S. PATENT DOCUMENTS

| | | | | | |
|---|---|---|---|---|---|
| 5,524,662 | A | * | 6/1996 | Benjey | B60K 15/03519 137/43 |
| 6,196,409 | B1 | * | 3/2001 | Lake | B65D 51/1616 215/261 |
| 6,557,719 | B1 | * | 5/2003 | Arnal | B60K 15/035 220/373 |
| 7,131,452 | B2 | * | 11/2006 | Potter | F16K 17/403 137/15.17 |
| 7,444,996 | B2 | * | 11/2008 | Potier | F02M 25/08 123/519 |
| 7,648,565 | B2 | * | 1/2010 | Clausen | B01D 19/0031 210/188 |
| 8,226,123 | B2 | * | 7/2012 | Chino | B60K 15/03519 137/142 |
| 8,360,087 | B2 | * | 1/2013 | Kolberg | F01N 3/2066 137/177 |
| 8,777,051 | B2 | * | 7/2014 | Whelan | B60K 15/03504 220/203.01 |
| 2001/0013516 | A1 | * | 8/2001 | Boecker | B29C 49/20 220/562 |
| 2005/0098160 | A1 | * | 5/2005 | Taxon | B60K 15/03519 123/516 |
| 2007/0189906 | A1 | * | 8/2007 | Palvolgyi | B60K 15/077 417/36 |
| 2009/0000599 | A1 | * | 1/2009 | Vulkan | B29C 65/342 123/509 |
| 2010/0147863 | A1 | * | 6/2010 | Grun | B60K 15/03504 220/746 |
| 2010/0319789 | A1 | * | 12/2010 | Erdmann | F02M 25/0836 137/202 |
| 2013/0192702 | A1 | * | 8/2013 | Chiasson | B29C 49/00 137/565.17 |
| 2013/0255797 | A1 | * | 10/2013 | Coulon | B60K 15/03519 137/386 |
| 2013/0297178 | A1 | * | 11/2013 | Hill | F02D 41/00 701/102 |
| 2014/0197188 | A1 | * | 7/2014 | Criel | B60K 15/03519 220/746 |
| 2015/0000521 | A1 | * | 1/2015 | Heap | B01D 19/0031 95/46 |
| 2015/0053704 | A1 | * | 2/2015 | Hill | B60K 15/03519 220/746 |
| 2015/0192064 | A1 | * | 7/2015 | Criel | B60R 21/0136 123/529 |
| 2015/0275924 | A1 | * | 10/2015 | De Man | B60K 15/03 417/209 |

FOREIGN PATENT DOCUMENTS

WO 2008 105724 9/2008
WO 2012 084108 6/2012

OTHER PUBLICATIONS

International Search Report Issued Jul. 19, 2013 in PCT/EP13/056982 Filed Apr. 3, 2013.

\* cited by examiner

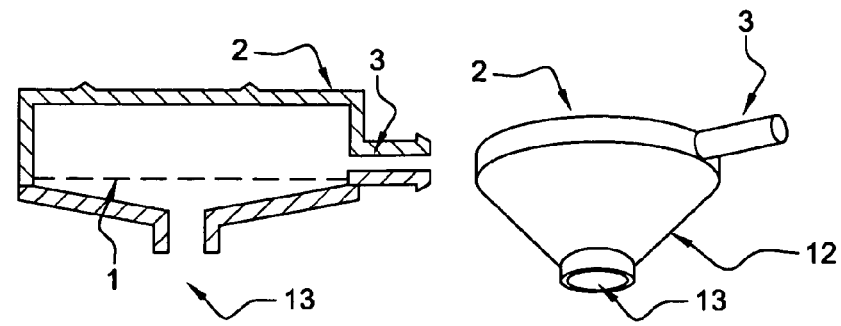
Fig. 7
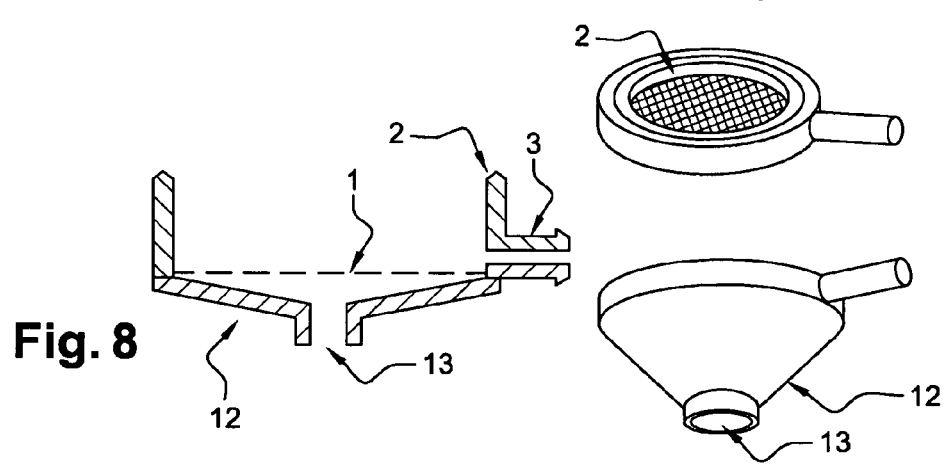
Fig. 8
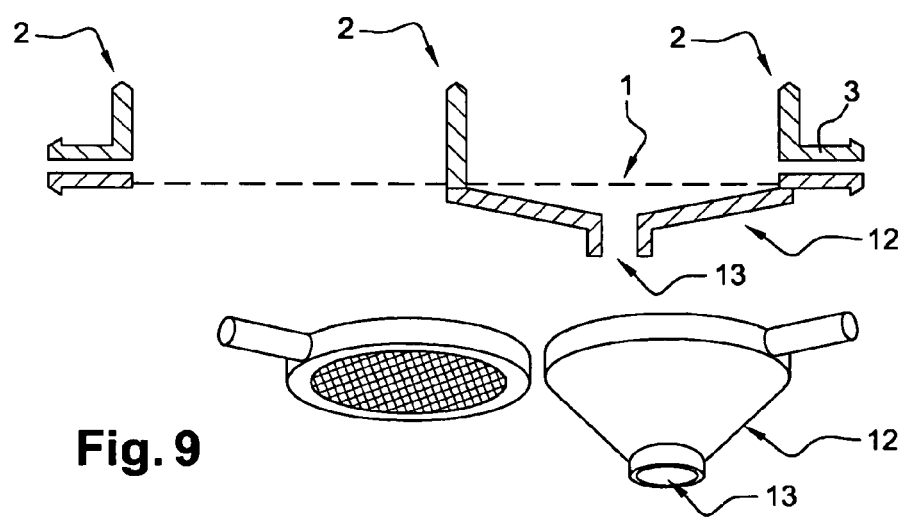
Fig. 9
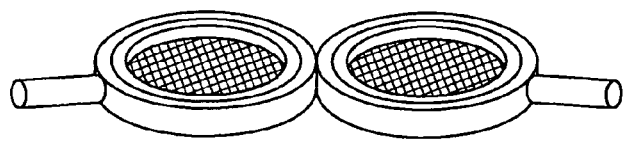

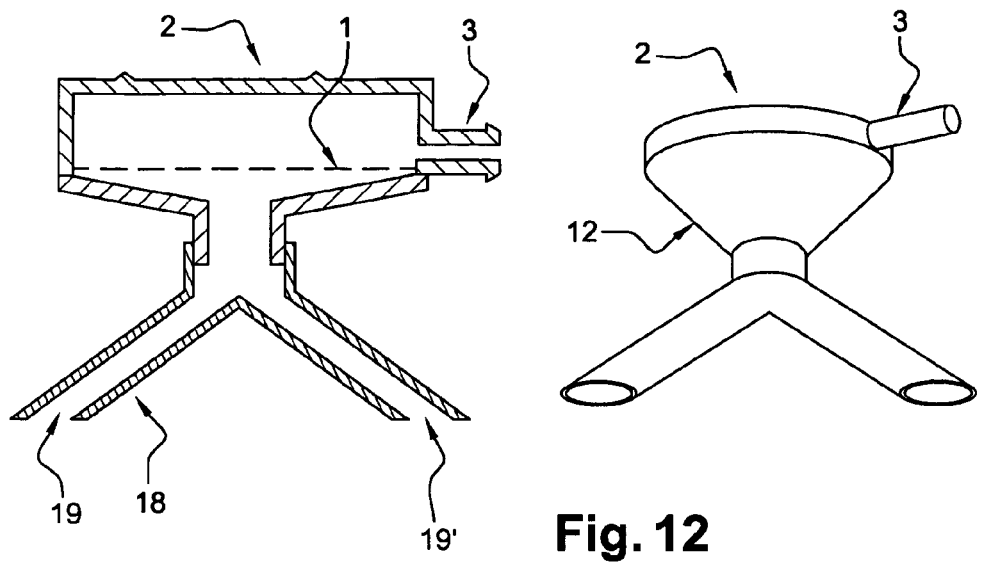
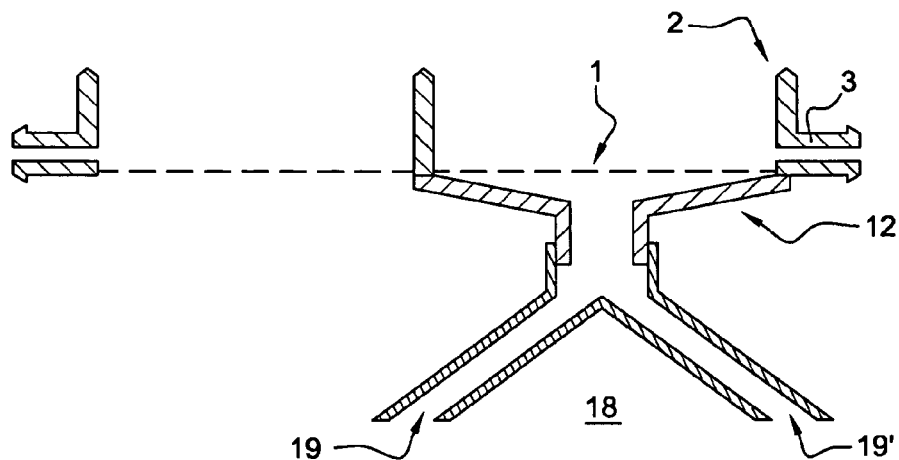
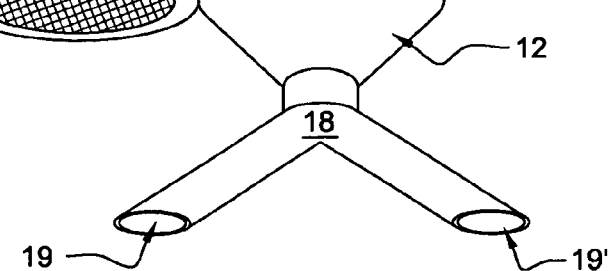
Fig. 12
Fig. 13

SOLID STATE VENTING VALVE FOR A FUEL TANK

The present invention relates to a valve for a liquid tank, in particular a fuel tank where there is limited vapor space.

It is known to use a float valve as a Fill Limit Venting Valve (FLVV) in fuel systems. Such a float valve is generally designed to avoid allowing substantial amounts of liquid fuel to pass into the venting line (liquid discrimination).

Known float-based valve systems are not suited for placement in an area of the tank where there is minimal height between the bottom of the tank and the top of the tank as well as minimal height between the full tank liquid height and the top of the tank. A float valve can be made short and wide, but as the height at which the valve shuts off becomes close to the height of the venting orifice, there is an increasing risk of fluid getting through before the valve closes. In addition, floatation of the float becomes more angle dependent as the float gets wider.

It is an object of embodiments of the present invention to provide a valve apparatus that at least partially overcomes the above mentioned problems.

According to an aspect of the invention, there is provided a valve apparatus for use in the interior of a fuel tank, the valve apparatus comprising a substantially flat housing defining a channel between an inlet orifice and a outlet orifice, and a membrane arranged to seal the channel, wherein the membrane is adapted to be impermeable to liquid fuel and permeable to fuel vapor.

It is an advantage of the valve apparatus according to the present invention that it can be implemented in a very flat form factor, and thus made to control a very high maximum filling level, without risking admission of liquid fuel into the venting tube. The size and shape of the housing of the valve apparatus according to the invention are chosen in such a way that the valve apparatus can be disposed in the interior of a fuel tank, preferably by attachment to the inside of the top wall of the fuel tank.

In an embodiment of the valve apparatus according to the invention, the substantially flat housing has the shape of a hollow prism or cylinder with a base and a mantle, wherein the inlet orifice is provided in the base and the outlet orifice is provided in the mantle, and wherein the membrane is sealingly attached along the perimeter of the inlet orifice.

In a particular embodiment, the prism or cylinder further has a top plane, the top plane comprising a bonding feature for facilitating attachment of the housing to the interior of the fuel tank.

It is an advantage of this embodiment that the housing can easily be secured to the top of the inside wall of the tank, without having to be concerned about creating a sealing bond between the valve and the tank.

In a more particular embodiment, the bonding feature is a circular ridge.

In an embodiment of the valve apparatus according to the invention, a top portion of the mantle is configured to be hermetically sealable to the interior of the tank surface during moulding to form the upper wall of the housing.

It is an advantage of this embodiment that the housing can be made even flatter, because there is no doubling of the top wall (the top of the tank serves as the top of the housing).

In an embodiment, the valve apparatus according to the invention further comprises a first coupling section for connecting a tube or a pipe to the outlet orifice.

In an embodiment, the valve apparatus according to the invention further comprises a first conical section arranged around the inlet orifice, the inlet of the conical section being narrower than the inlet orifice.

It is an advantage of this embodiment that the closing of the valve can be made largely independent of the angle at which the tank is oriented, within reasonable bounds.

In a particular embodiment, the valve apparatus according to the invention further comprises a second coupling section for connecting a tube or a pipe, arranged at the inlet of the conical section.

In a more particular embodiment, the valve apparatus according to the invention further comprises a Y-shaped pipe, connected to the second coupling section.

It is an advantage of this embodiment that it can be used in saddle tanks, providing appropriate fill-level control for the tanks as a whole, even though filling is conducted via one pocket.

In a more particular embodiment, the valve apparatus according to the invention further comprises a bleed orifice provided in the Y-shaped pipe.

In an embodiment of the valve apparatus according to the invention, the substantially flat housing is shaped as a disc with a rim suitable for hermetically attaching the valve apparatus to a hole in the fuel tank by fusion welding, the inlet orifice and the outlet orifice are provided with respective tubular extensions, the membrane is sealingly attached along the perimeter of a distal end of the tubular extension of the inlet orifice, and the membrane extends into the tubular extension of the inlet orifice in a substantially conical form.

According to an aspect of the invention, there is provided a dual valve assembly comprising a valve according to any of claims 2-5 and a valve according to claim 6-9, the respective housings of both valves being joined together.

This aspect of the invention provides a compact solution for situations where vapor must be transportable to a canister and a filling pipe.

According to an aspect of the invention, there is provided a fuel tank comprising at least one valve apparatus or dual valve assembly as described above, the at least one valve apparatus or dual valve assembly being disposed in the interior of the fuel tank.

According to an aspect of the invention, there is provided a motor vehicle comprising a fuel tank as described above.

The above and other objects, features and advantages of the invention will become apparent from a consideration of the subsequent detailed description presented in connection with accompanying drawings, in which.

Figure 1:
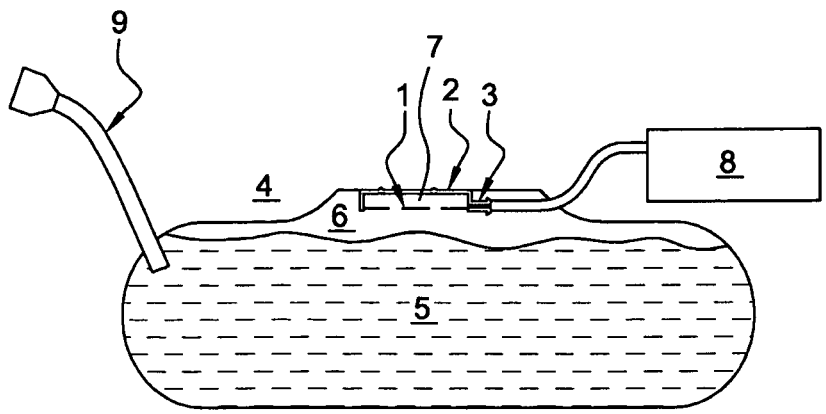
FIG. 1 illustrates a valve apparatus according to an embodiment of the invention, installed in an exemplary manner in a fuel tank with a filling pipe and a canister, the valve apparatus being operatively connected to the canister.
Figure 2:
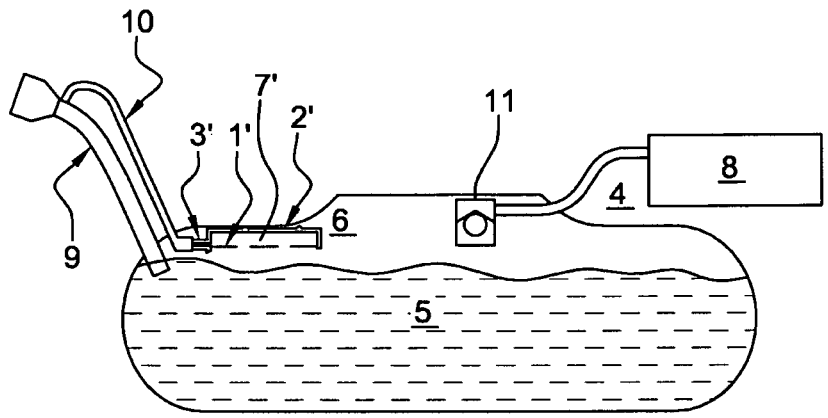
FIG. 2 illustrates a valve apparatus according to an embodiment of the invention, installed in an exemplary manner in a fuel tank with a filling pipe and a canister, the valve apparatus being operatively connected to the filling pipe.
Figure 3:
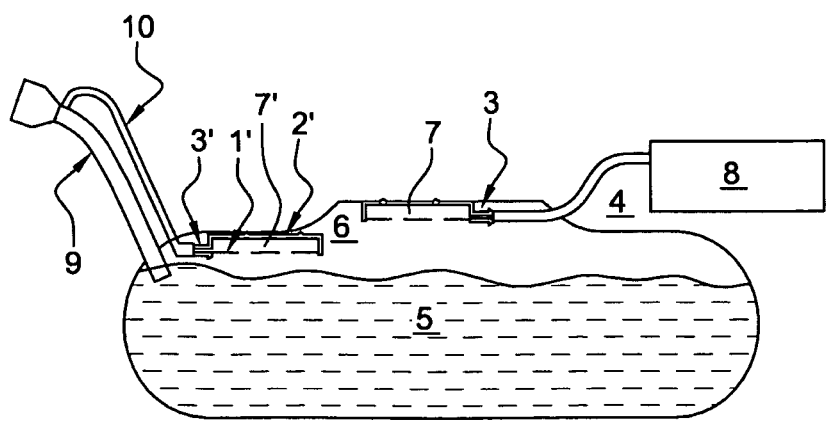
FIG. 3 illustrates two valve apparatus according to embodiments of the invention, installed in an exemplary manner in a fuel tank with a filling pipe and a canister, the valve apparatus being operatively connected to the canister and the filling pipe, respectively.
Figure 4:
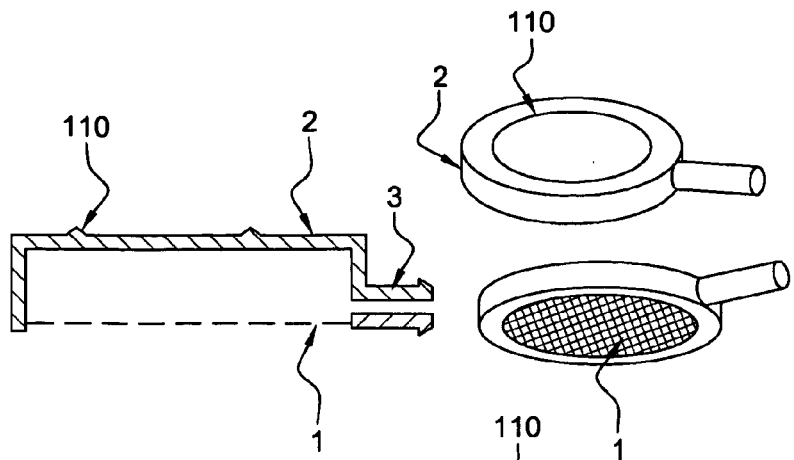
Figure 5:
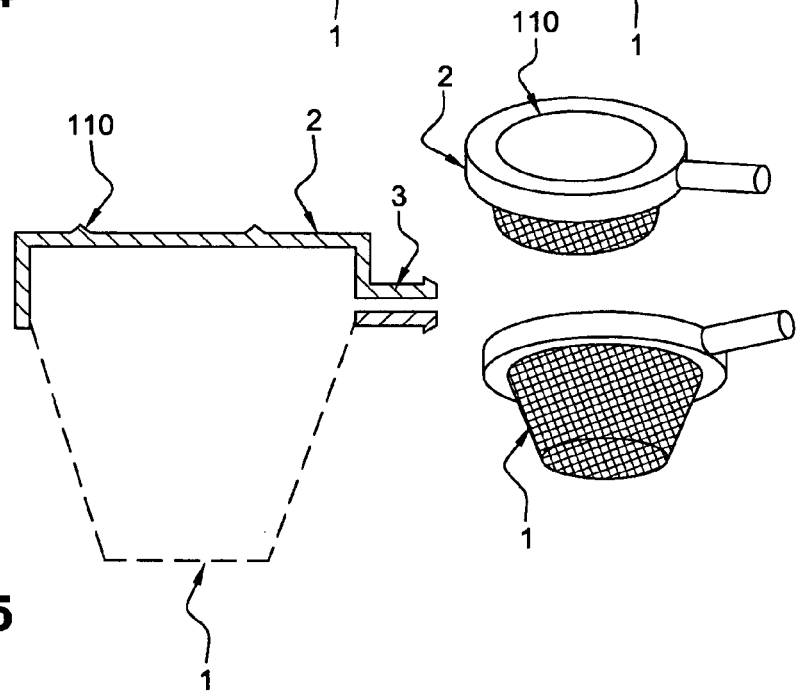
Figure 6:
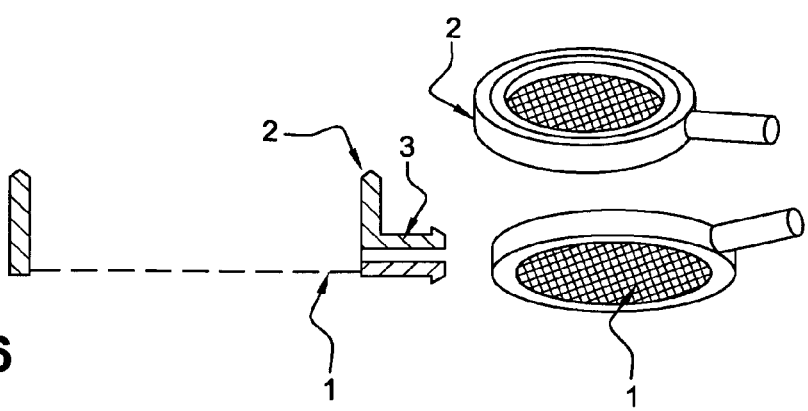
Figure 10:
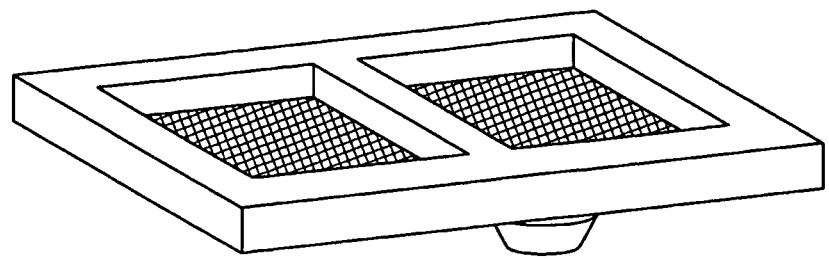
Figure 11:
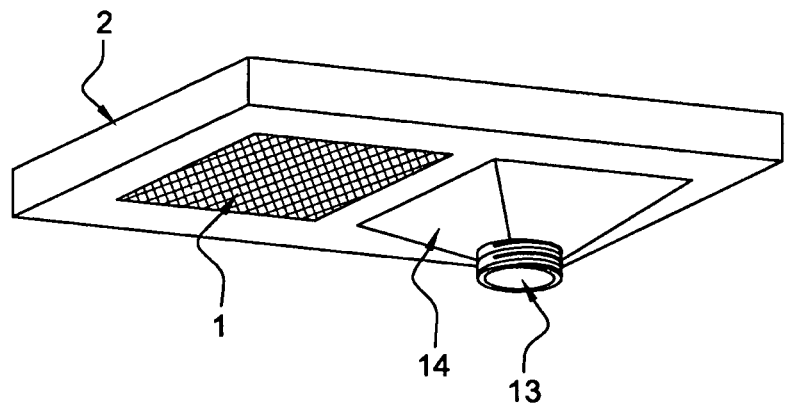
Figure 11:
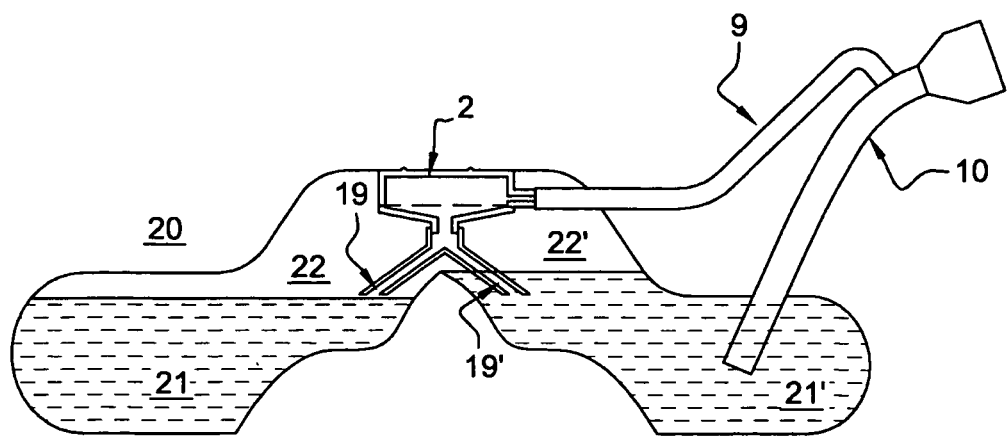
Figure 14:
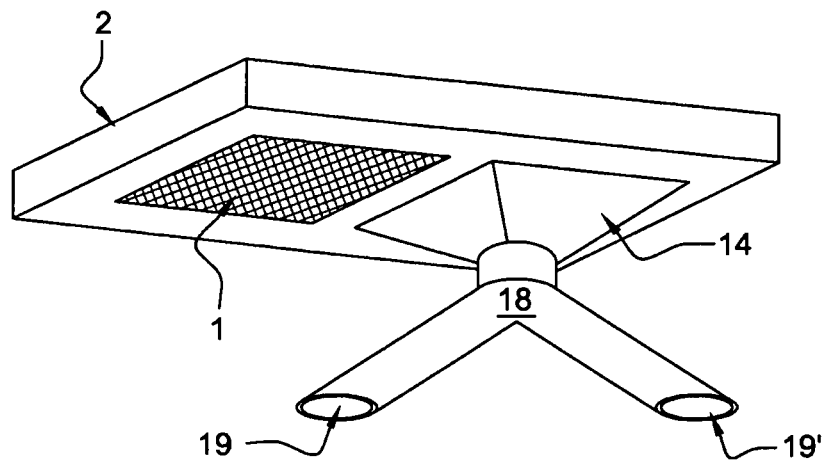
Figure 15:
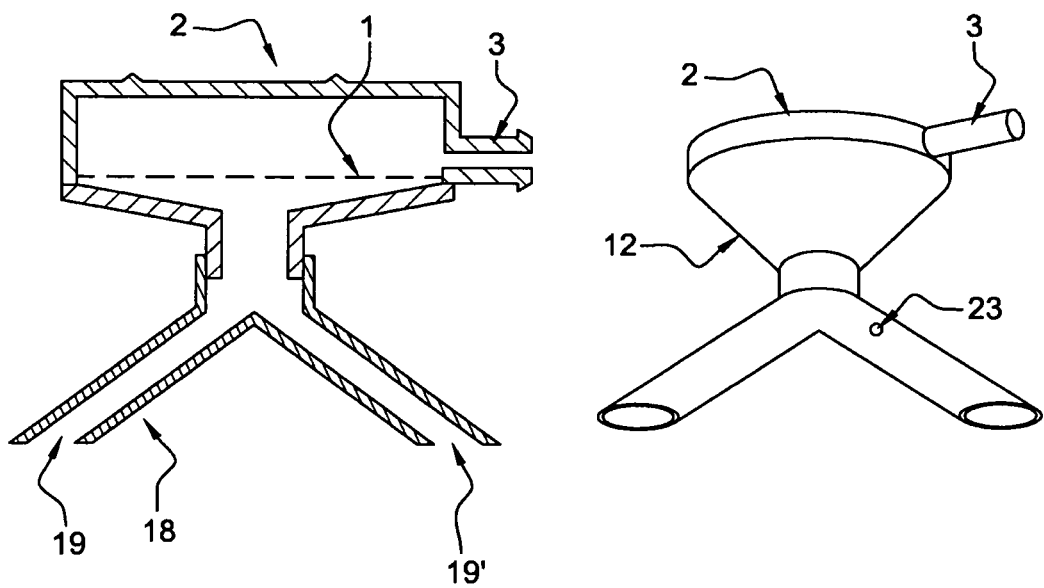

FIG. 4 provides a cross-section and perspective views of a valve apparatus according to an embodiment of the present invention illustrated in FIGS. 1-3;

FIG. 5 provides a cross-section and perspective views of a valve apparatus according to another embodiment of the present invention;

FIG. 6 provides a cross-section and perspective views of a valve apparatus according to yet another embodiment of the present invention;

FIG. 7 provides a cross-section and perspective views of a valve apparatus according to yet another embodiment of the present invention;

FIG. 8 provides a cross-section and perspective views of a valve apparatus according to yet another embodiment of the present invention;

FIG. 9 provides a cross-section and perspective views of a dual valve assembly according to an embodiment of the present invention;

FIG. 10 provides perspective views of a dual valve assembly according to another embodiment of the present invention;

FIG. 11 illustrates a valve apparatus according to another embodiment of the invention, installed in an exemplary manner in a fuel tank of the "saddle tank" type with a filling pipe, the valve apparatus being operatively connected to the filling pipe;

FIG. 12 provides a cross-section and perspective views of a valve apparatus according to an embodiment of the present invention illustrated in FIG. 11;

FIG. 13 provides a cross-section and perspective views of a dual valve assembly according to an embodiment of the present invention suitable for use in a fuel tank of the "saddle tank" type;

FIG. 14 provides perspective views of a dual valve assembly according to another embodiment of the present invention suitable for use in a fuel tank of the "saddle tank" type;

FIG. 15 provides a variant of the embodiment of FIG. 12; and

Figure 16:
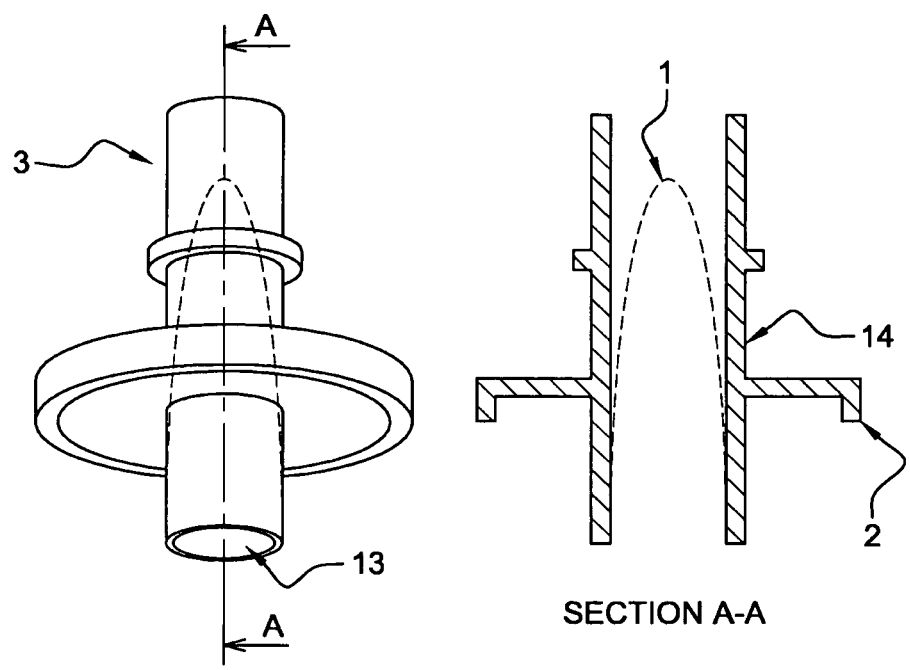

FIG. 16 provides a cross-section and a perspective view of a valve apparatus according to yet another embodiment of the present invention.

Throughout the figures, like reference numerals have been used to designate like features. Pairs of functionally similar features may be designated by a numeral as such, and the same numeral with a prime ('), respectively.

The present invention provides a passive solution for a Fill Limit Venting Valve (FLVV) and more so a large orifice Roll-Over Valve (ROV) for mechanical seal applications in fuel tanks, and in particular saddle tank applications, where the height of the tunnel restricts the use of a conventional ROV or FLVV.

The term "fuel tank" is understood to mean an impermeable tank that can store fuel under diverse and varied environmental and usage conditions. An example of this tank is that with which motor vehicles are equipped. The fuel tank used in conjunction with the invention is preferably made of plastic. "Fuel" is understood to designate a mix of liquid or liquefied hydrocarbons, as normally used to power internal combustion engines, including fuels known as gasoline, diesel oil, ethanol, etc.

The term "plastic" means any material comprising at least one synthetic resin polymer.

All types of plastic may be suitable. Particularly suitable are plastics that belong to the category of thermoplastics. In particular, polyolef[iota]ns, thermoplastic polyesters, polyketones, polyamides and copolymers thereof may be used. A blend of polymers or copolymers may also be used; similarly it is also possible to use a blend of polymeric materials with inorganic, organic and/or natural fillers such as, for example, but non-limitingly: carbon, salts and other inorganic derivatives, and natural or polymeric fibres. One polymer often employed is polyethylene. Excellent results have been obtained with high-density polyethylene (HDPE).

The wall of the tank may be composed of a single thermoplastic layer, or of two layers. One or more other possible additional layers may, advantageously, be composed of layers made of a material that is a barrier to liquids and/or gases. Preferably, the nature and thickness of the barrier layer are chosen so as to minimize the permeability of liquids and gases in contact with the internal surface of the tank. Preferably, this layer is based on a barrier resin, that is to say a resin that is impermeable to the fuel such as, for example, EVOH (a partially hydrolysed ethylene/vinyl acetate copolymer). Alternatively, the tank may be subjected to a surface treatment (fluorination or sulphonation) for the purpose of making it impermeable to the fuel.

The tank preferably comprises an EVOH-based barrier layer located between the HDPE-based outer layers.

The plastic tank is generally produced by moulding a parison. The term "parison" is understood to mean a preform, which is generally extruded and is intended to form the wall of the tank after moulding to the required shapes and dimensions. This preform does not necessarily have to be a one-part preform.

When the valve apparatus according to the present invention is integrated in a fuel tank, it is preferably attached thereto by welding during the moulding stage of the fuel tank, at which point the parison is still in its at least partially molten state, which allows welding without applying additional heat.

The present invention relates to a passive liquid vapor separator for a fuel system, comprising a semi-permeable membrane that allows liquid vapor to flow through it, but disallows liquid from passing through the membrane.

Preferably, the semi-permeable membrane is substantially made of expanded polytetrafluoroethylene (ePTFE, commercially known inter alia as Gore-Tex), a strong microporous material which may be obtained by rapidly stretching polytetrafluoroethylene (PTFE, commercially known as Teflon). The liquid-vapor separation properties of this material are believed to result from the non-wetting nature of the fluorine, which causes the adhering fluids to create drops that are too large to fit through the pores as a result of the occurring surface tension. Several other materials exist with similar properties, and other materials are under development. The skilled person will appreciate that other materials with suitable porosity or microperforations may be used and are within the scope of the present invention.

The liquid vapor separator has open communication to the interior of the fuel tank on one side (Side A), and open communication to a venting line on the other side (Side B). The component is welded to the interior of the tank via a twin sheet operation preferably. In one embodiment a hermetic seal is created between the interior of the tank and the Side B of the liquid vapor separator.

FIG. 1 describes the general architecture of the present invention. The figure depicts a fuel tank (4) which normally has a certain volume of liquid fuel (5) and vapor space (6). Disposed in the vapor space (6) is a membrane (1) and a housing (2) that separates the liquid and vapor space (5&6) from the chamber (7), allowing only fuel vapor to be transferred to the carbon canister (8) so as to avoid contamination and pass through to the atmosphere, as the carbon canister (8) has an outlet to the atmosphere. Thus, the chamber (7) defined by the housing (2) in fact forms a channel that fluidly connects the inlet (in this instance, the orifice covered by the membrane and opening into the vapor dome of the fuel tank) with the outlet (in this instance, the orifice connected to the canister). The outlet is preferably equipped with a coupling section (3) configured to facilitate coupling with a tube or a pipe (e.g., a barbed or quick-connect coupling).

FIG. 2 describes a similar embodiment to FIG. 1, but in this case the membrane (1') discriminates liquid from flowing up the recirculation pipe (10) of the refueling tube (9). As a result, when the height of the liquid in the tank (5) reaches the level of membrane (1') the communication between the refueling pipe (9) and the tank (4) is cut off, signaling the end of a refueling event. For normal venting purposes, a float style valve (11) may be positioned to discriminate liquid from entering the carbon canister (8) from the tank.

FIG. 3 depicts an exemplary solution where both the recirculation line (10) and the carbon canister are protected by the membrane (1,1').

FIG. 4 depicts one embodiment of the invention in which the membrane (1) is flat and is affixed to the housing (2) via a hermetic seal, created via mechanical or chemical bond between the housing (2) and the membrane (1). In addition, a bonding feature, (110) is integrated to facilitate a mechanical or chemical bond to the interior of the tank, ideally during the moulding process.

FIG. 5 depicts another embodiment in which the membrane (1) is 3-dimensional and preferably in a conical shape, as to increase the overall flow rate through the membrane (1) but also to cause a gradual increase in pressure drop across the membrane as the fluid level rises against it, allowing for favorable refueling characteristics.

FIG. 6 depicts another variation of the embodiment of FIG. 4 or 5 where the top of the housing (2) is open—i.e., the housing does not comprise a top plane—and may be hermetically sealed to the interior of the tank surface during moulding so as to form the upper wall of the housing (2).

FIG. 7 depicts still another embodiment of the invention. A conical section (12) is added to the bottom of the assembly to create a flow path (13) with a diameter that is substantially smaller than the diameter of the membrane (1). The diameter (12) corresponds with the effective flow rate of the membrane (12) of shown diameter, which naturally is substantially larger than the diameter of the orifice (13) since the membrane (1) is only semi-permeable and has a lower effective area of flow. The advantage to the orifice (13) is that it allows for ample flow, but does not have compromised shutoff characteristics if the fluid surface is not parallel to the surface of the housing (2).

FIG. 8 depicts another variation of the embodiment of FIG. 7, where the top if the housing (2) is open, and may be hermetically sealed to the interior of the tank surface during moulding to form the upper wall of the housing (2).

FIG. 9 depicts a dual valve assembly, i.e. a further embodiment of the invention, in which two liquid vapor discriminators are packaged into one assembly. In this embodiment, a single housing (2) with a partition in the middle defines two discrete chambers. One chamber shares the characteristics of FIGS. 4 and 6, in which a flat membrane (1) is directly exposed to the fluid, so as to allow for the lowest distance between the top of the tank and the height at which fuel covers the membrane blocking flow. The second chamber shares the performance features of FIGS. 7 and 8, creating a defined shutoff height, that is preferably lower than the height of the membrane (1). The embodiment, although not illustrated could be realized with both a pre-formed upper wall as in FIGS. 4 and 7 or with an upper wall that is defined when the component is welded to the top wall of the fuel tank as in FIGS. 6 and 8.

FIG. 10 depicts an improvement to the embodiment of FIG. 9, in which the housing of the valve assembly (2) is square or rectangular, so as to maximize the amount of membrane (1) surface area that is exposed, allowing for maximum air/vapor flow. This also minimizes the amount of membrane (1) that is scrapped in the case that the membrane (1) is die cut from a sheet. This rectangular profile could preferably be implemented in the design of all the previous figures.

FIG. 11 depicts a further improvement to the invention aimed at fuel systems with two distinct pockets (21,21'), commonly known as "saddle tanks", that are filled from one pocket, relying on the fluid to spill over from one pocket (21') to the other (21), resulting in an uneven fluid level (22, 22') at the end of a refueling event. In addition to uneven fuel levels (22, 22') during a refueling event, it is possible that through dynamic sloshing of the fuel, the ratio of fuel between the two pockets (22, 22') could reverse, blocking the communication path on the secondary side, which in normal cases would result in a fuel system that is not able to be refueled. By implanting the a Y-shaped pipe with venting openings (19,19') in both pockets (21,21') the situation can be avoided, as the primary port (19') would allow for venting in the case that the secondary port (19) was covered by fuel (22).

FIG. 12 shows a more detailed embodiment of the invention described in FIG. 11. In this figure, a Y-shaped pipe (18) is attached to the bottom of the conical lower housing (12) described in previous figures. This Y-shaped pipe (18) could be molded with the housing (12) or more preferably clipped to the housing (12) forming a seal between the two parts. The advantage of clipping, is that the Y-shaped pipe (18) can be manufactured separately from the upper housing (12) allowing either component to become common across several tank architectures with different upper tank surfaces and/or different fuel levels at shutoff.

FIG. 13 shows a combination of the embodiment in FIG. 9 with the Y-shaped pipe (18) included. This formation is especially advantageous for tanks with two distinct pockets and a high area in the center, since this high area in the center has limited surface area, but allows for ideal location of a venting valve, as well as orientation of the Y-shaped pipe (18).

FIG. 14 is a combination of the embodiment in FIG. 10 and the Y-shaped pipe (18), in order to optimize venting surface are and minimize membrane (1) scrap as previously mentioned.

FIG. 15 shows yet another improvement to the invention in which a small bleed orifice (23) is added to the Y-shaped pipe (18) above the full fluid level, to minimize a pressure spike at shutoff, in order to mitigate any fuel rising rapidly up the fill pipe and exiting the pipe as a result.

This bleed orifice (23) could be tuned to optimize refueling performance. This bleed orifice could be implemented into any of the embodiments.

FIG. 16 shows another embodiment of the invention, which is more suited to external welding.

In this embodiment, the substantially flat housing (2) serves as a welding pad, which creates a surface for creating a hermetic seal to the tank surface via fusion welding. Both the inlet and the outlet may be extended by a tube-like shape, so as to create a generally tube-shaped channel or vent port (14). In this embodiment a conical membrane (1) is placed inside the vent port (14) which is placed over a hole bored in the fuel tank and hermetically attached thereto by fusion welding. Like the previous embodiment, the membrane (1) and the inlet (13) are sized to have similar open area to meet the flow requirements of the fuel system. A barbed or quick connect port (3) allows the vent port (14) to communicate with the carbon canister or a recirculation line in some cases via a tube.

Although the invention has been described hereinabove by reference to specific embodiments, this is done for illustrative and not for limiting purposes. Moreover, features disclosed in connection with one particular embodiment may be combined with features from other embodiments to obtain the same technical effects and advantages, without leaving the scope of the present invention.

Generally, cylindrical shapes and prismatic shapes could be used interchangeably in embodiments of the valve apparatus according to the present invention. Cylindrical shapes are preferred, because they facilitate coupling with the generally circular orifice in the tank wall (if any), and with the generally cylindrical venting tubes.

Generally, cylindrical or prismatic shapes could be replaced by slightly frustoconical or frustopyramidal shapes in embodiments of the valve apparatus according to the present invention.

The skilled person will appreciate that other variants of the present invention may be within the scope of the attached claims.

The invention claimed is:

1. A liquid fuel tank comprising a valve apparatus, the valve apparatus comprising:
   a substantially flat housing defining a channel between an inlet orifice and an outlet orifice; and
   a membrane arranged to seal the channel, wherein the membrane is configured to be impermeable to liquid fuel and permeable to fuel vapor,
   wherein the valve apparatus is fully arranged within the fuel tank by attachment to an inside of a top wall of the fuel tank, and
   wherein the valve apparatus comprises a conical section arranged around the inlet orifice, said conical section constituting the lowest part of the valve apparatus, an inlet of the conical section being narrower than the membrane diameter.

2. The liquid tank according to claim 1, wherein the substantially flat housing has a shape of a hollow prism or cylinder with a base and a mantle, wherein the inlet orifice is provided in the base and the outlet orifice is provided in the mantle, and wherein the membrane is sealingly attached along a perimeter of the inlet orifice.

3. The liquid tank according to claim 2, wherein the prism or cylinder further has a top plane, the top plane including a bonding feature to facilitate attachment of the housing to an interior of the fuel tank.

4. The liquid tank according to claim 3, wherein the bonding feature is a circular ridge.

5. The liquid tank according to claim 2, wherein a top portion of the mantle is configured to be hermetically sealable to a surface of the interior of the tank during molding to form an upper wall of the housing.

6. The liquid tank according to claim 1, further comprising a first coupling section to connect a tube or a pipe to the outlet orifice.

7. The liquid tank according to claim 1, further comprising a second coupling section to connect a tube or a pipe, arranged at the inlet of the conical section.

8. The liquid tank according to claim 7, further comprising a Y-shaped pipe, connected to the second coupling section.

9. The liquid tank according to claim 8, further comprising a bleed orifice provided in the Y-shaped pipe.

10. The liquid tank according to claim 1, wherein the substantially flat housing is shaped as a disc with a rim configured to hermetically attach the housing to a hole in the fuel tank by fusion welding, wherein the inlet orifice and the outlet orifice include respective tubular extensions, wherein the membrane is sealingly attached along a perimeter of a distal end of the tubular extension of the inlet orifice, and wherein the membrane extends into the tubular extension of the inlet orifice in a substantially conical form.

11. A dual valve assembly comprising a valve according to claim 2 and a second valve, respective housings of both valves being joined together.

12. A motor vehicle comprising the fuel tank according to claim 1.

13. The liquid tank according to claim 1, wherein the inlet defines a lone opening for the fuel vapor.

14. The liquid tank according to claim 1, wherein the membrane is located downstream of the inlet of the conical section.

15. The liquid tank according to claim 1, the housing including an open top portion to be affixed to an interior of the tank.

* * * * *